(No Model.)
W. E. C. EUSTIS.
ELECTRIC LOCOMOTIVE.
No. 501,246.
2 Sheets—Sheet 1.
Patented July 11, 1893.
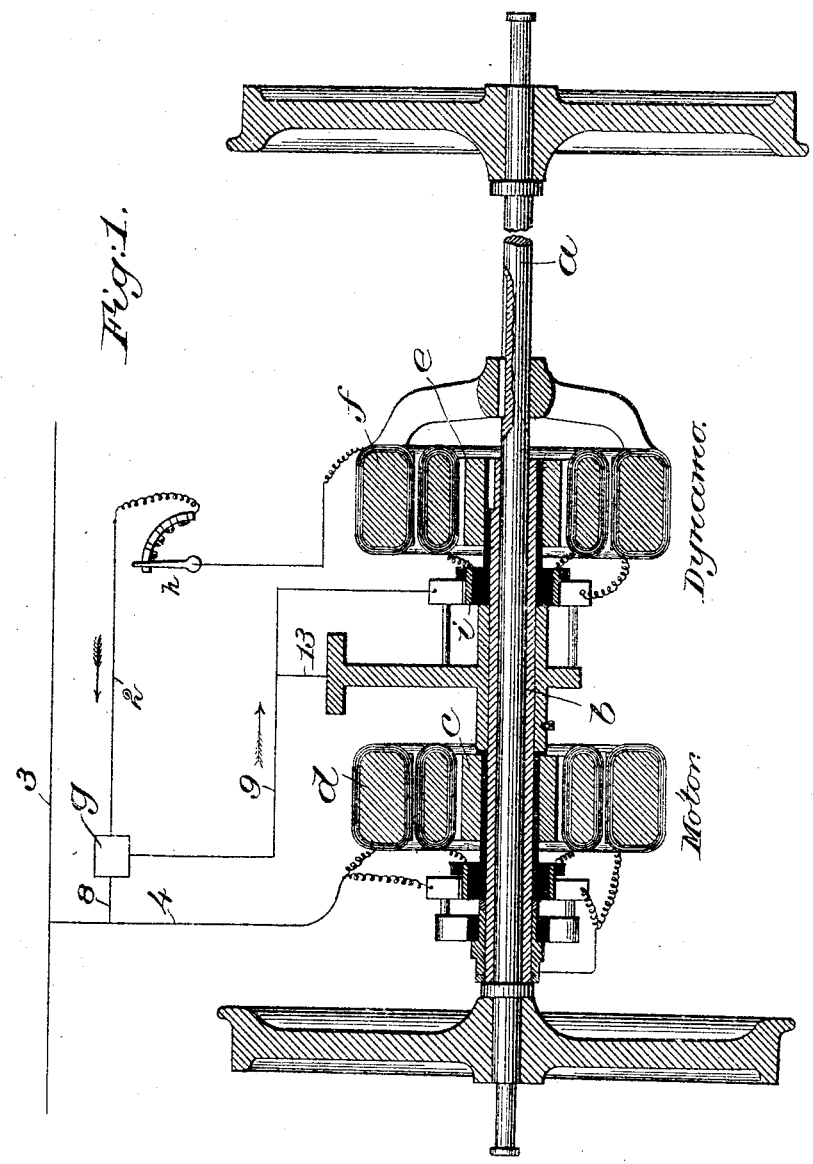
Witnesses.
Edward F. Allen.
Louis N. Dowell.
Inventor.
William E. C. Eustis.
by Crosby & Gregory
Attys.

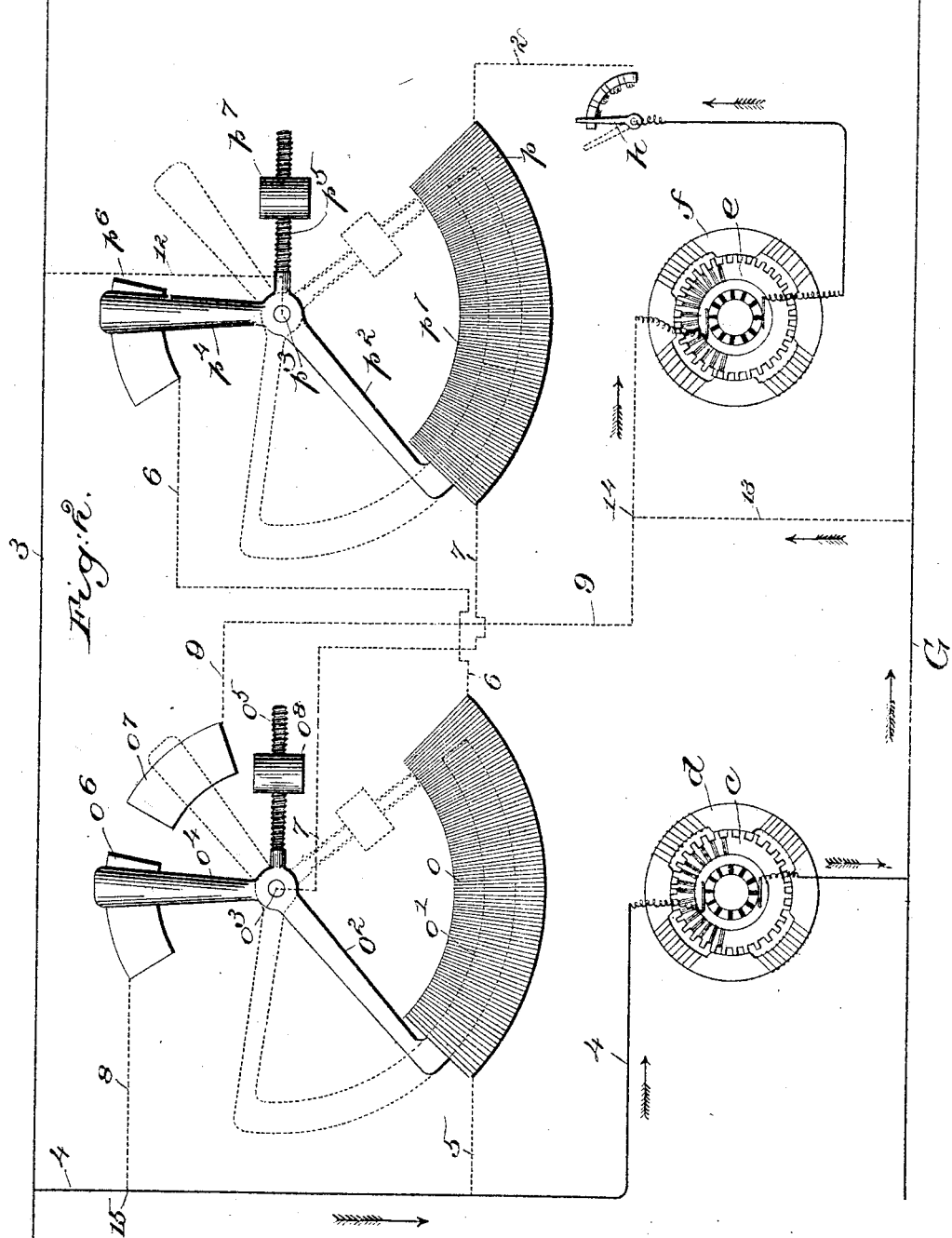

UNITED STATES PATENT OFFICE.

WILLIAM E. C. EUSTIS, OF MILTON, MASSACHUSETTS.

ELECTRIC LOCOMOTIVE.

SPECIFICATION forming part of Letters Patent No. 501,246, dated July 11, 1893.

Application filed November 5, 1891. Serial No. 411,116. (No model.)

*To all whom it may concern:*

Be it known that I, WILLIAM E. C. EUSTIS, of Milton, county of Norfolk, State of Massachusetts, have invented an Improvement in Car-Axles, of which the following description, in connection with the accompanying drawings, is a specification, like letters and figures on the drawings representing like parts.

This invention relates to electric driving mechanisms for car axles or other rotatable devices, one principal object of the invention being to reduce the current necessary to set the axle or device in rotation, a second object of the invention being to provide at the same time and by the same mechanism an electric clutch or connection between the axle or device to be rotated and its actuator, the latter object, however, being incidental to the former.

In accordance with this invention the electric motor which constitutes the actuator is connected with and to operate the movable member of an electric generator, which latter is electrically connected with the actuating motor, so that the current produced by the generator may be caused to pass to the motor to augment the supply of current therefor. This generator preferably has its fixed member (fixed being employed in contradistinction to the movable member above referred to) connected with the axle or member to be rotated to thereby serve the double function primarily as a generator, and incidentally as an electric clutch or connection between the actuator and the axle or member to be rotated.

One part of this invention therefore consists of a member to be driven, an electric motor, a two-part auxiliary generator, one part of which is rotated by the motor, and the other part of which actuates the member to be driven, and electric connections between the generator and motor whereby the current may be caused to pass through the motor, substantially as will be described.

Other features of this invention will be hereinafter described and pointed out in the claims.

Figure 1 shows in horizontal section an electric motor and dynamo-electric machine mounted on an axle to be driven in accordance with this invention, the circuits being shown in diagram; and Fig. 2 shows a diagrammatical view of a controlling device which may be employed to determine whether or not the current generated by the dynamo-electric machine shall augment the main current.

The axle $a$ has mounted on it a sleeve $b$, to which is secured the armature $c$ of an electric motor, the field magnets $d$ of said motor being supported by any suitable frame-work, not shown, the said frame-work supporting in usual manner the commutator brushes of the motor. The electric motor is herein represented as shunt-wound, although any other suitable form or construction may be employed. The armature $e$ of an electric generator is made fast to the opposite end of said sleeve $b$, and the field magnets $f$ of said generator are keyed or otherwise secured to the axle $a$, the said armature and field magnets constituting the two members of the generator, one of which members, in the present instance the field magnets, will be hereinafter termed the fixed member, although in fact it is movable, the term "fixed" being used to distinguish it from the other member which moves relatively to it.

The armature $e$ and field magnets $f$ may be of any suitable construction, and are herein represented as connected in series in a short circuit, which for clearness will be called the dynamo circuit.

The wire 4 is connected to the trolley wire 3, and includes the motor $c$, $d$.

A suitable switching device $h$ is provided for switching the generator into and out of circuit, by opening and closing the dynamo circuit.

The armature $c$ of the motor rotates continuously, and hence the sleeve $b$ and the armature $e$ will also rotate continuously, while the field magnets of the generator, being fixed to the car axle or member to be rotated, move when such member is moved, and remain stationary when such axle or member is stationary, so that if when the car is at a standstill and the axle and its attached field magnets of the generator are stationary, the switching device $h$ be operated to close the circuit of the generator through its rotating armature and fixed field magnets, the said generator will immediately produce a strong current through its circuit, as will be more fully hereinafter described.

As soon as the generator begins to generate or produce a current of electricity, the rotating armature will tend to drag the field around after it, and as the field in this present instance is fixed to the axle which is rotatable, the said field and axle will by this drag be gradually set in rotation gaining continually in speed, but owing to the resistance of the load the axle can never attain the speed at which the armature is rotated by the motor, but will be run at a very much lower rate of speed than the said motor. It will be seen that as the armature $e$ of the generator revolves very much faster than the field magnets $f$, the said armature will continually cut the lines of force extending between the field magnets and will thereby generate a current of electricity, which current, however, is greatest when the current is first turned through the generator, and thereafter decreased gradually as the speed of rotation of the field on the axle approaches that of the armature rotated by the motor. This current generated by the generator on the axle which is herein termed an auxiliary generator to distinguish it from the main generator of the line may be employed for any purpose desired, being added to the main current whenever the pressure is great enough, a suitable controlling device being represented at $g$, Fig. 1, which operates to permit such current to augment the main current when a certain pressure is reached.

Referring to Fig. 2, the controlling device $g$ consists of two switches, made substantially alike. One of the switches consists of a solenoid $p$, the armature $p'$ of which is secured to the outer end of an arm $p^2$, pivoted at $p^3$; and radiating from the pivot $p^3$ are two more arms $p^4$, $p^5$, one of which engages or disengages a switch-plate $p^6$ according to the position of the armature, and the other supports an adjustable weight $p^7$. The other switch consists of a solenoid $o$, the armature $o'$ of which is secured to the outer end of an arm $o^2$, pivoted at $o^3$, and radiating from the pivot $o^3$ are two more arms $o^4$, $o^5$, one of which is designed to engage one or another switch-plate $o^6$ or $o^7$, according to the position of the armature, and the other to support an adjustable weight $o^8$. These two switches are connected in circuit as follows: The coil $p$ is connected at one end or side by wire 2 to one side of the generator, said device including the device $h$, and the opposite end or side of said coil $p$ is connected by wire 7 to the arm $o^4$; and the plate $o^7$ is connected by the wire 9 to the other side of the generator. This circuit, comprising the wire 2, coil $p$, wire 7, arm $o^4$, plate $o^7$, and wire 9, constitutes the generator circuit. The arm $p^4$ is connected by wire 12 to the trolley wire 3; the plate $p^6$ is connected by wire 6 to one side of the solenoid $o$, the opposite side of which is connected by wire 5 to the wire 4. The plate $o^6$ is connected by wire 8 to the wire 4.

As shown in dotted lines, Fig. 2, the switching device $h$ is open, and the parts are in a position of inactivity, and when said switching device $h$ is closed the short generator circuit will be closed, which includes the generator. The arm $p^4$ will, however, remain disengaged from the plate $p^6$. As soon as the current generated by the generator in this short generator circuit reaches a certain predetermined pressure, the armature $p'$ will be attracted, the arm $p^4$ closing on the plate $p^6$, thereby establishing a circuit leading from the trolley wire 3 to the wire 12, arm $p^4$, plate $p^6$, wire 6, coil $o$, wire 5, wire 4, motor $c$, $d$, to ground. As soon as this branch circuit is closed, the armature $o'$ will be attracted, and the arm $o^4$ will leave the plate $o^7$ and close on the plate $o^6$, thereby opening the short generator circuit and establishing the new ground circuit including wire 4, wire 8, plate $o^6$, arm $o^4$, wire 7, coil $p$, wire 2, generator $e$, $f$, and ground wire 13, which latter wire leads from the short generator circuit at 14. When this ground circuit is established, the current generated by the generator in the direction of the arrows is directed into the main line circuit at the point 15 and proceeds thence to the ground over the ground 4 leading from the trolley. The pressure at which the coil $p$ will operate to attract its armature $p'$, may be adjusted by the particular winding of the coil.

The generator $e$, $f$, instead of being self-excited, as shown, may be excited from any external source.

When the car is running at a constant speed, the relative speeds of the sleeve $b$ and axle $a$ will remain unchanged; but when it is desired to stop the car, and the switch $h$ is opened, the generator circuit will be opened, and the armature $e$ will revolve without either influencing or being influenced by the field magnets. The speed can be regulated by resistances at the switch $h$ in any usual manner.

When it is desired to start the car, the switch $h$ acts to close the generator circuit, the armature $e$ of the generator at such time revolving at high speed; and as the field magnets and axle start from a point of rest, a current of great pressure will be generated at the start, gradually decreasing as the field magnets increase in speed. This current being added to the main current, as above described, at the time of starting the car, greatly assists in accomplishing such result.

I claim—

1. The combination with a member to be rotated, of an electric motor, a two-part auxiliary generator, one part of which is connected with the member to be rotated and the other part of which is connected with and rotated by the armature of said electric motor, whereby rotation by the motor of one part of said generator with relation to the other part to generate a current of electricity causes said other part to also rotate and thereby act as a clutch to rotate the member to be rotated; and electrical connections between said generator and motor, whereby the current generated by the former may be caused to pass through the latter, substantially as described.

2. The combination with a member to be rotated, of an electric motor; a two-part auxiliary generator, one part of which is connected with the member to be rotated, and the other part of which is connected with and rotated by the armature of said electric motor, whereby rotation by the motor of one part of said generator with relation to the other part to generate a current of electricity causes said other part to also rotate and thereby act as a clutch to rotate the member to be rotated; electrical connections between said generator and motor, and a switch device controlled by the strength of the generated current to automatically turn the said current through said connections to and through the said motor, substantially as described.

3. The axle $a$, and electric motor, combined with the auxiliary generator driven by said motor, a short circuit, a controlling device operated by the short circuit for diverting the current produced by said generator, substantially as described.

4. An axle, and an electric motor, combined with an auxiliary generator driven by said motor, an actuating coil in circuit with said generator, and a circuit-controlling device for the generator controlled by the armature of said coil to divert the current of electricity produced by said generator, substantially as described.

5. An axle, an electric motor, and an operating ground circuit therefor, combined with an auxiliary generator driven by said motor, a circuit controlling device in circuit with the said generator, said circuit controlling device being operated by the generator current when the latter has reached a certain pressure to ground said generator circuit through the operating ground circuit for the motor, substantially as described.

In testimony whereof I have signed my name to this specification in the presence of two subscribing witnesses.

WILLIAM E. C. EUSTIS.

Witnesses:
   BERNICE J. NOYES,
   AUGUSTA E. DEAN.